United States Patent
Koziol

(10) Patent No.: US 6,375,129 B2
(45) Date of Patent: Apr. 23, 2002

(54) CABLE HOLDER FOR ATTACHING CABLES IN A VEHICLE

(75) Inventor: Siegmund Koziol, Hohenlinden (DE)

(73) Assignee: Eads Deutschland GmbH, Munich (DE)

( * ) Notice: Subject to any disclaimer, the term of this patent is extended or adjusted under 35 U.S.C. 154(b) by 0 days.

(21) Appl. No.: 09/800,134

(22) Filed: Mar. 5, 2001

(30) Foreign Application Priority Data

Mar. 6, 2000 (DE) .......................................... 100 10 935

(51) Int. Cl.$^7$ ................................................ F16L 8/22
(52) U.S. Cl. ..................... 248/68.1; 248/74.1; 248/74.3; 248/909; 248/900; 248/65; 248/548; 174/65 R; 211/26
(58) Field of Search ........................ 248/65, 68.1, 74.3, 248/49, 69, 909, 548, 900, 549, 59, 70, 73, 247, 248, 300; 211/26; 174/65 R, 68.1, 68.3, 101; 24/16 R, 495

(56) References Cited

U.S. PATENT DOCUMENTS

| | | | | |
|---|---|---|---|---|
| 3,363,864 A | * | 1/1968 | Olgreen ........................ | 248/68 |
| 3,861,015 A | * | 1/1975 | Hooven ........................ | 29/203 |
| 4,845,316 A | * | 7/1989 | Kaercher ..................... | 174/135 |
| 4,870,722 A | * | 10/1989 | Shell, Jr. .................... | 24/16 R |
| 4,909,461 A | * | 3/1990 | Collins ........................ | 248/68.1 |
| 4,960,253 A | | 10/1990 | Perrault et al. ............. | 248/68.1 |
| 5,032,703 A | * | 7/1991 | Henschen et al. ......... | 319/85.22 |
| 5,277,006 A | * | 1/1994 | Ruster ......................... | 52/220 |
| 5,516,062 A | * | 5/1996 | Sato ............................. | 248/68.1 |
| 5,587,555 A | * | 12/1996 | Rinderer ..................... | 174/49 |
| 5,927,041 A | | 7/1999 | Sedlmeier et al. ......... | 52/730.1 |
| 6,049,949 A | | 4/2000 | Guthke ....................... | 24/16 PB |
| 6,129,342 A | * | 10/2000 | Bronstad .................... | 256/13.1 |
| 6,170,784 B1 | * | 1/2001 | MacDonald et al. ...... | 248/65 |
| 6,254,041 B1 | * | 7/2001 | Dufourg ...................... | 248/65 |

FOREIGN PATENT DOCUMENTS

| | | |
|---|---|---|
| DE | 675892 | 5/1939 |
| DE | 1886744 | 1/1964 |
| DE | 1896156 | 7/1964 |
| DE | 1989458 | 7/1968 |
| DE | 3013750 | 10/1981 |
| DE | 9005666 | 9/1990 |
| DE | 9317299 | 3/1994 |
| EP | 0718946 | 6/1996 |

* cited by examiner

*Primary Examiner*—Kimberly T. Wood
(74) *Attorney, Agent, or Firm*—Ladas & Parry

(57) ABSTRACT

A cable holder for attachment of cables in a vehicle structure is formed as an elongated plate provided with indicator markings at predetermined spacing along longitudinal edges of the plate so that the plate can be divided into plate segments of determined length at the markings. Two rows of retainer elements which form open loops at the upper surface of the plate are provided. The retainer elements are adapted to secure the connectors of the cables to the plate. The retainer elements in one row are longitudinally offset from the retainer elements of the other row such that a retainer element in one row extends between two retainer elements in the other row.

13 Claims, 1 Drawing Sheet

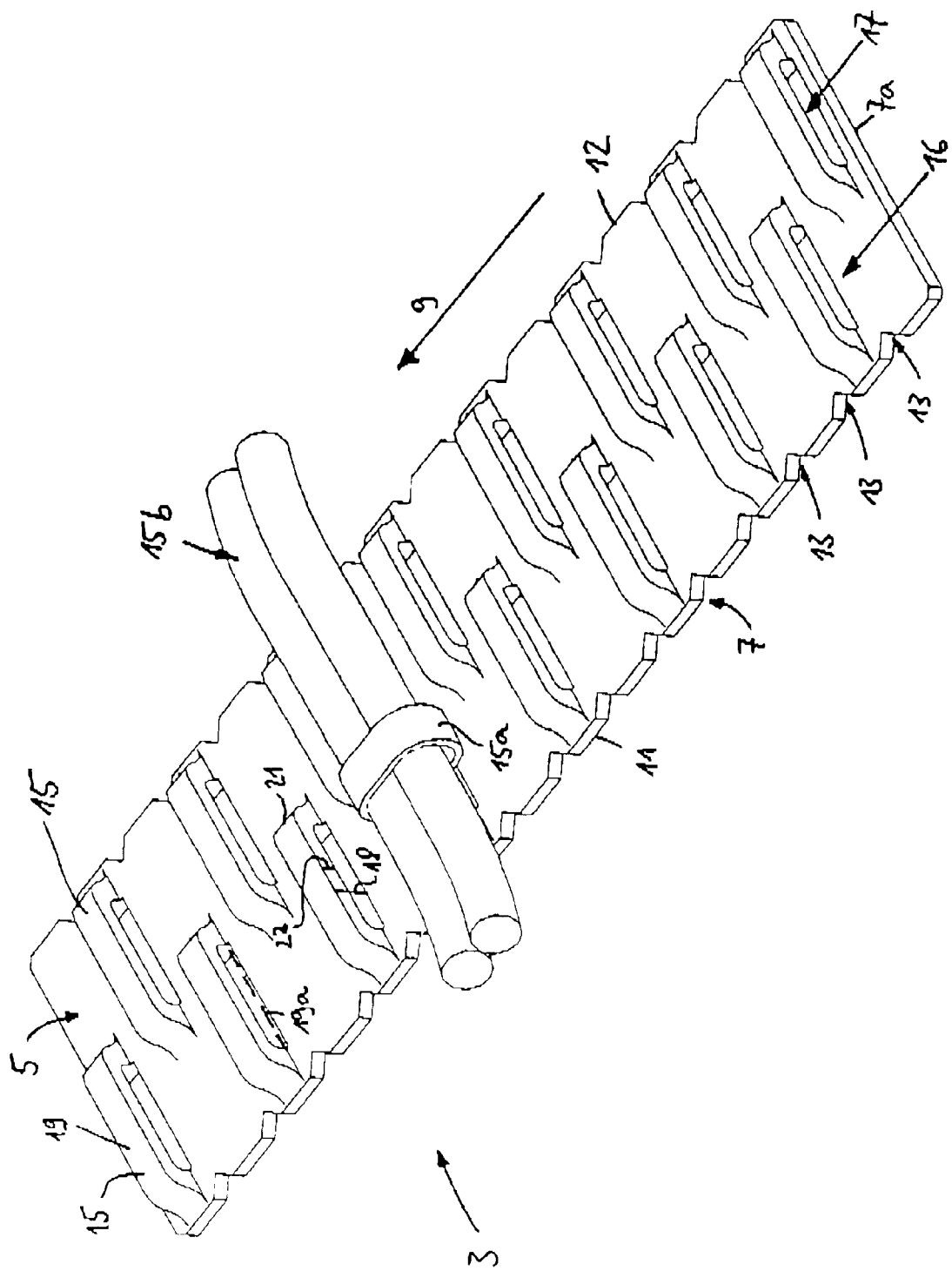

CABLE HOLDER FOR ATTACHING CABLES IN A VEHICLE

FIELD OF THE INVENTION

The invention relates to a cable holder for attaching cables to aircraft structures.

A SECTION BACKGROUND AND PRIOR ART

It is known to employ cable holders formed as appropriately shaped connection elements for attaching cable connectors, such as straps, to a vehicle structure. Such connection elements can be, for example, hooks and eye connections.

DE 30 13 750 A1 discloses a cable holder for attaching cables by means of cable connectors, the holder comprising an elongated strip with loops spaced uniformly along the length of the strip.

DE 90 05 666 U1 discloses a sheet metal part having a loop for attaching cables to the sheet metal part by a cable strap.

The known cable holders have the disadvantage of not being adaptable to available space on the structure to accommodate various arrangements of cables and cable bundles.

SUMMARY OF THE INVENTION

An object of the invention is to provide a cable holder for vehicle structures which can be mounted on the structure in a simple manner at any location on the structure and at any orientation whereby a number of cables can be readily mounted in various directions and at high density.

The above and further objects are achieved according to the invention by a cable holder which comprises an elongated plate having longitudinal edges provided with indicator markings spaced at predetermined distances along the longitudinal edges, the plate being separable at the indicator markings to provide plate segments of determined length. The plate is provided with first and second rows of retainer elements on its upper surface. The retainer elements extend transversely on the upper surface of the plate in longitudinally spaced relation along each row. The retainer elements form open loops at the upper surface of the plate for attachment of cable connectors thereto. The retainer elements in the first and second rows are displaced from one another in the longitudinal direction of the plate such that the loops in one row alternate with the loops in the other row.

A feature of the invention is that the loops transversely overlap one another so that each loop in any one row extends between two loops in the other row.

A further feature of the invention is that the retainer elements are integrally formed with the plate as a one piece body preferably molded from a plastic material.

A further feature of the invention is that the lower surface of the plate can be slightly curved so that an adhesive can be applied to the lower surface which can then be pressed against the vehicle structure at the location where the cables are to be connected.

According to a further feature of the invention, the indicator markings are formed as notches along the longitudinal edges of the plate and serve as guides for locating where the plate can be severed to form the divided segments.

A BRIEF DESCRIPTION OF THE DRAWING

The sole FIGURE of the drawing is a perspective view of a cable holder according to the invention.

DETAILED DESCRIPTION

The drawing illustrates a cable holder 1 according to the invention in the form of a elongated plate 3 having an upper surface 5 and a lower surface 7. The plate 3 is adapted to be adhesively secured to a support surface of a vehicle structure as will be explained more fully hereafter. The lower surface 7 can be curved as shown at 7a to assure uniform application of adhesive at the lower surface of the plate.

The plate 3 is elongated in the longitudinal direction 9 and cables 15b to be attached to the cable holder 1 extend transversely of the plate 3.

The plate 3 is provided with indicator markings 13 in the form of notches at predetermined and uniform spacing along the longitudinal edges 11, 12 of the plate 3. The notches serve as guides at which the plate 3 can be severed to form plate segments. Although the notches have been shown on both longitudinal edges it may be feasible to provide the notches along only one longitudinal edge. The spacing between successive notches is between 8 and 15 mm. The plate 3 can be divided into plate segments of desired length as measured by the location of the indicator markings 13 and depending on the available space on the support surface on the vehicle structure for the plate segment and on the number of cables to be attached. The plate 3 is divided at the indicator markings 13 by cutting, sawing or the like. In this way plate segments of a specified known length can be obtained.

Two rows 16, 17 of retainer elements 15 are integrally formed as a one piece body with plate 3 and the retainer elements are raised at the upper surface of plate 3 to form open loops at the upper surface of the plate 3. Conventional cable connectors 15a, such as straps, can be secured to the plate 3 through the loops of the retainer elements. The retainer elements 15 extend transversely of the plate 3 in the same direction as the cables 15b. The retainer elements 15 are uniformly spaced in the longitudinally direction of the plate 3 and the retainer elements in rows 16 and 17 are offset longitudinal such that the retainer elements in one row alternate with the retainer elements in the other row. The retainer elements overlap in the transverse direction of the plate so that a retainer element in one row extends between two retainer elements in the other row.

The spacing between the retainer elements 15 in each row is between 8 and 15 mm and preferably is 10 mm. The height 18 of the retainer elements 15, i.e. the distance between the upper surface 19 of the retainer element and the upper surface 5 of plate 3 is between 4 and 8 mm and preferably is 6 mm. The width 21 of the retainer elements 15 is between 4 and 6 mm and preferably is 5 mm. The thickness 23 of the retainer elements is between 1 and 4 mm and preferably is 2 mm. The opening 19a of the loop of each retainer element is between 8 and 12 mm and preferably is 10 mm. The size and weight of the retainer element 15 is determined so that for the material of the plate a high production capacity as well as sufficient strength and loadability is obtained for the vehicle construction and particularly for an aircraft structure.

The cable holder 1 is made of a plastic material, such as polyether ether ketone. The plastic material can be reinforced with up to 10 to 30% by weight of glass fibers and preferably the glass fibers are provided in the upper limit of 30% by weight.

In use the plate 3 of the cable holder 1 is divided by separation at the indicator marking according to the available space on the support surface of the vehicle structure. The segment of plate 3 is then adhesively secured to the support surface of the vehicle structure by a two component polyurethane elastomer adhesive. After the adhesive has hardened the cables individually or in the form of bundles can be attached to the plate segment by means of the conventional cable connectors.

Although the invention is described in relation to a specific embodiment thereof it will become apparent to those skilled in the art that numerous modifications and variations can be made without departing from the scope and spirit of the invention as defined in the attached claims.

What is claimed is:

1. A cable holder for attaching cable connectors of cables to a vehicle structure, said cable holder comprising:

an elongated plate having upper and lower surfaces, the lower surface being attachable to a vehicle structure, said plate having a longitudinal edge provided with indication markers spaced at predetermined distances along said longitudinal edge, said plate being separable at said indication markers to provide plate segments of determined length, and first and second rows of retainer elements on said upper surface of said plate, said retainer elements extending transversely on said plate in uniform, longitudinally spaced relation, said retainer elements forming open loops at said upper surface of said plate for attachment of cable connectors thereto, the retainer elements in said first and second rows being displaced from one another such that the loops in one row alternate with the loops in the other row longitudinally of the plate.

2. The cable holder of claim 1, wherein said retainer elements are integrally formed with said plate as a one-piece body.

3. The cable holder of claim 2, wherein said plate is made from polyether ether ketone.

4. The cable holder of claim 3, wherein said plate comprises up to 10–30% by weight of glass fibers.

5. The cable holder of claim 1, wherein each said loop defines an opening above the upper surface of the plate with a length of 8–12 mm.

6. The cable holder of claim 1, wherein the retainer elements are longitudinally spaced in each row by 8–15 mm.

7. The cable holder of claim 1, wherein the retainer elements have a height between 4 and 8 mm and a width between 4 and 6 mm.

8. The cable holder of claim 1, wherein said lower surface of the plate is curved for receiving an adhesive.

9. The cable holder of claim 8, wherein said adhesive comprises a two component polyurethane elastomer adhesive.

10. The cable holder of claim 1, wherein the retainer elements in one row overlap the retainer elements in the other row in a traverse direction.

11. The cable holder of claim 1, wherein said indicator markings comprise notches in said longitudinal edge.

12. The cable holder of claim 1, wherein said plate is provided with said indicator markers along its opposite longitudinal edge.

13. The cable holder of claim 1, wherein said plate is made of plastic material which can be severed at said indicator markers to provide said segments of determined length.

* * * * *